United States Patent
Maughan

Patent Number: 6,082,923
Date of Patent: Jul. 4, 2000

[54] CONVERGING SPHERE JOINT ASSEMBLY

[75] Inventor: Garth B. Maughan, Delta, Ohio

[73] Assignee: Dana Corporation, Toledo, Calif.

[21] Appl. No.: 09/039,790

[22] Filed: Mar. 16, 1998

[51] Int. Cl.[7] .................................................. F16C 11/06

[52] U.S. Cl. ..................... 403/135; 406/133; 406/124; 406/126

[58] Field of Search .................... 403/135, 137, 403/140, 133, 132, 122, 124, 126

[56] References Cited

U.S. PATENT DOCUMENTS

| | | | |
|---|---|---|---|
| 2,855,665 | 10/1958 | Alldredge | 403/140 X |
| 2,917,334 | 12/1959 | Baker | 403/140 |
| 3,233,929 | 2/1966 | Herbenar | 403/140 |
| 3,375,028 | 3/1968 | Patton | 403/126 |
| 3,848,032 | 11/1974 | Harada et al. | 403/140 |
| 3,850,443 | 11/1974 | Hassan . | |
| 4,318,627 | 3/1982 | Morin | 403/140 X |
| 4,606,668 | 8/1986 | Schmidt . | |
| 4,650,363 | 3/1987 | Kehl et al. | 403/135 X |
| 4,722,631 | 2/1988 | Tagami . | |
| 4,974,985 | 12/1990 | Glatzel . | |
| 5,011,320 | 4/1991 | Love et al. . | |
| 5,492,428 | 2/1996 | Hellon et al. | 403/135 X |
| 5,496,125 | 3/1996 | Maughan . | |

*Primary Examiner*—Brian K. Green
*Assistant Examiner*—David E. Bochna
*Attorney, Agent, or Firm*—Rader, Fishman & Grauer PLLC

[57] ABSTRACT

A ball and socket joint includes a stud having a shank connected to a ball stud, which is received in a ball stud housing. A one piece bearing shell is provided having a generally spherically shaped hollow body with an inner surface to matingly engage the ball stud and an outer surface for contacting the stud housing. Moreover, the outer bearing shell surface includes a first spherical portion having a first radius and first center and a second spherical portion having a second radius and second center. The first and second centers are axially offset relative to each other to create a converging sphere design that permits a low profile design. The converging sphere design also permits more effective compression pre-loading on the bearing sleeve as compared to a single spherical outer surface.

17 Claims, 2 Drawing Sheets

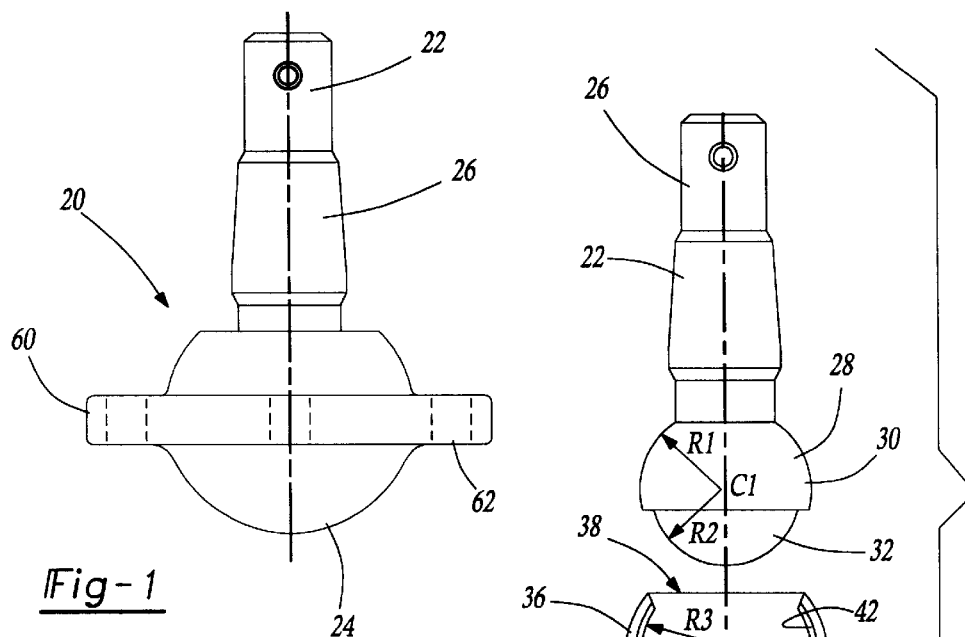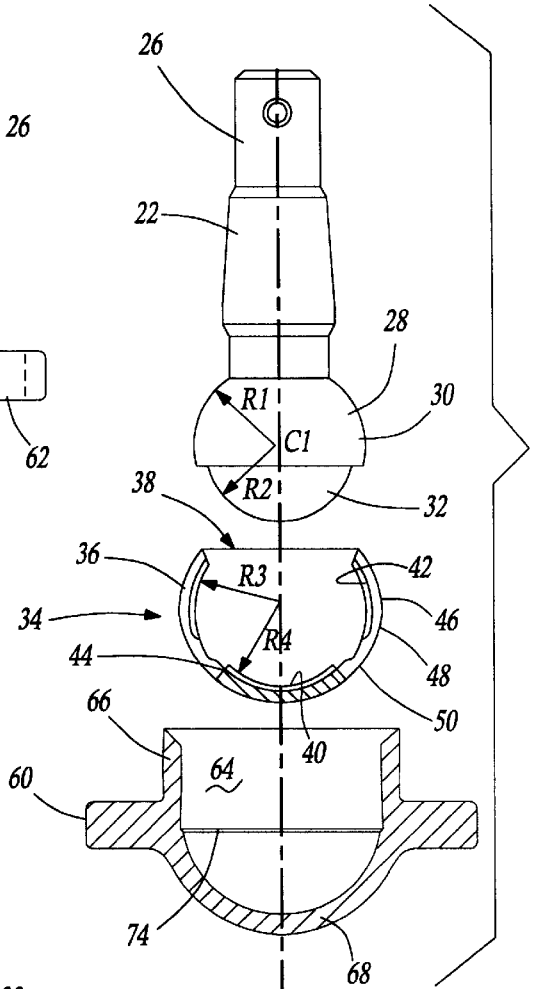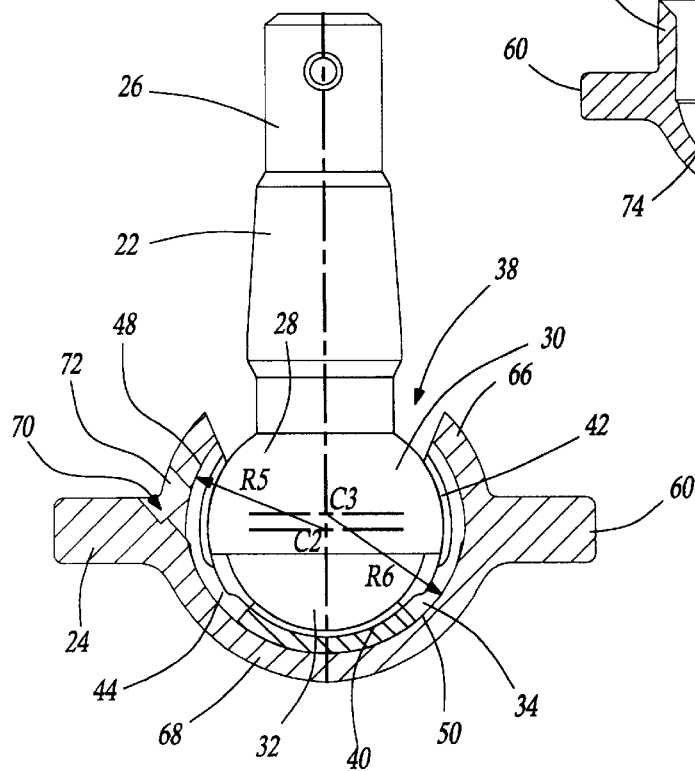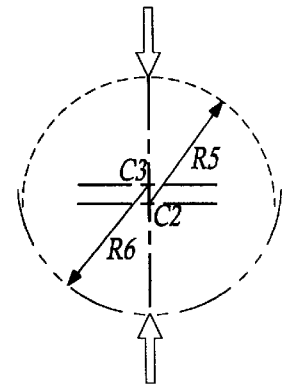

6,082,923

CONVERGING SPHERE JOINT ASSEMBLY

FIELD OF THE INVENTION

The present invention relates to a ball and socket joint and, in particular, to a low profile, serviceable ball and socket joint having a bearing shell with converging outer spherical surfaces and a ball stud having dual diameter ball portions.

BACKGROUND OF THE INVENTION

Ball and socket joints are used in a variety of applications including: rack and pinion inner tie rod socket assemblies, steering knuckles, drag links, and connecting rod assemblies. Such joints typically include a cylindrical housing member for receiving a bearing together with a head of a ball stud. Some of the known joints have ball studs having two different sized spherical members, however such joints usually have two piece bearings, each bearing designed to engage a respective one of the spherical members.

However, there are several drawbacks with the known two piece bearing designs. In two piece bearings, the probability for misalignment of one bearing relative to the other can result in increased wear and decreased service life. Two piece bearings must be larger in size to achieve effective pre-loading, resulting in a higher profile joint. Higher profile joints are not desired when clearances are minimal. Also, two piece bearings increase the number of parts in a ball and socket joint and thereby increase inventory costs and assembly costs. Therefore, there is a need for a low profile ball and socket joint that avoids the drawbacks of two piece bearing designs.

SUMMARY OF THE INVENTION

The present invention is directed to a ball and socket joint having a stud that includes a shank connected to a ball stud and is received in a ball stud housing. A one piece bearing shell is provided having a generally spherically shaped hollow body with an inner surface to matingly engage the ball stud and an outer surface for contacting the stud housing. Moreover, the outer bearing shell surface includes a first spherical portion having a first radius and first center and a second spherical portion having a second radius and second center. The first and second centers are axially offset relative to each other to create a converging sphere design that permits a low profile design. The converging sphere design also permits more effective compression pre-loading on the bearing sleeve as compared to a single spherical outer surface. In addition, the first and second radii of the outer surface can be different lengths to further contribute to the converging sphere design. Compression pre-loading is effected by mechanical deformation of an upper rim on the housing.

The ball stud can have two different sized ball portions adjacent one another and the inner bearing shell surface can include first and second inner bearing surfaces that generally correspond with a respective ball portion. An undercut is located between the first and second inner bearing surfaces that allows smooth articulation of the ball stud without binding. The bearing shell further includes longitudinal slots to permit radial outward expansion of the bearing shell during insertion of the ball stud.

The present invention also includes a lubrication system that efficiently delivers lubricant to the first and second bearing surfaces. A bore is provided in the housing for initially introducing lubricant. A circumferential groove is formed in the housing to communicate with the lubricant bore. Next, axial slots in the bearing shell provide a passageway for lubrication to reach the first and second inner bearing surfaces. Finally, the first and second inner bearing surfaces contain optional lubrication grooves to increase lubricant capacity at the bearing surfaces.

Accordingly, the present invention provides a low profile, re-greaseable ball and socket joint that reduces the number of component parts and still provides for efficient compression pre-loading to increase joint tightness.

BRIEF DESCRIPTION OF THE DRAWINGS

The features and inventive aspects of the present invention will become more apparent upon reading the following detailed description, claims, and drawings, of which the following is a brief description:

FIG. 1 is a front view of a joint assembly according to the present invention.

FIG. 2 is a partial cross-sectional view of the joint assembly of FIG. 1.

FIGS. 3 is an exploded view of the present invention.

FIG. 7 illustrates the different radiuses of an outer surface of the bearing shell shown in FIG. 2.

DETAILED DESCRIPTION OF PREFERRED EMBODIMENTS

Figure 4A:
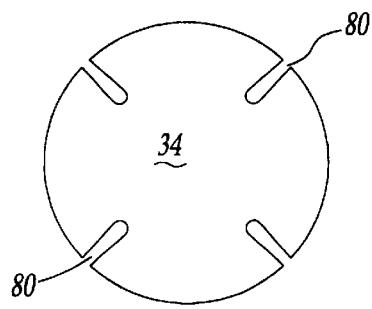
FIGS. 4A, 4B, 4C and 4D show respective views of a bearing shell according to the present invention.

FIGS. 1–3 show a low profile ball and socket joint 20 having a metallic stud 22 received in a metallic ball stud housing 24. Stud 22 is capable of articulating motion relative to housing 24 to compensate for relative movement between respectively joined components (not shown). Stud 22 includes a shank 26 connected to a ball stud 28. Ball stud 28 preferably has two different size ball portions 30, 32 to provide a more compact design with improved loading. A proximal ball portion 30 having a radius R1 is located immediately adjacent to shank 26 and distal ball portion 32 having a radius R2 is located adjacent to proximal ball portion 30, axially away from shank 26. Radius R1 is larger than radius R2, creating higher unit loading on distal ball portion 32 and lower unit loading on proximal ball portion 30. Preferably, but optionally, radius R1 and radius R2 have a common center C1 to enable smooth sliding articulation of stud 22.

A single piece bearing shell 34 is designed to be positioned in housing 24 for receiving ball stud 28. Bearing shell 34 has a generally spherical, hollow body 36 that includes an opening 38 for entry of ball stud 28. Bearing shell 34 also includes a first bearing surface 40 located generally diametrically opposite to opening 38 for engagement with at least a portion of distal ball portion 32. A second bearing surface 42 is located adjacent to opening 38 for engagement with proximal ball portion 30 to provide an effective bearing interface. Preferably, but optionally, first and second bearing surfaces 40, 42 have different sized radii R3 and R4 and generally correspond in size and shape with their respective ball portions 30, 32 to provide approximately full bearing surface contact and effective load distribution. An undercut 44 is optionally provided between first and second bearing surfaces 40, 42 to create clearance that permits greater articulating movement of stud 22. Bearing shell 34 is preferably made from plastic to provide an excellent bearing surface that is made from a different material than ball stud 28. However, any suitable material can be utilized.

Bearing shell 34 also has an outer surface 46 that includes first and second spherical portions 48, 50. Spherical portions 48, 50 have different sizes and offset centers to create a converging sphere design that improves compressibility of bearing shell 34 during assembly. As shown in FIGS. 2 and 7, first spherical portion 48 has a radius R5 and a center C2 and second spherical portion 50 has a radius R6 and a center C3. Radius R5 is generally smaller than radius R6. In addition, center C2 of first spherical portion 48 is axially offset relative to center C3 such that center C3 is closer to opening 38 than is center C2. Best shown in FIGS. 2 and 7, first spherical portion 48 is offset downwardly relative to second spherical portion 50. The converging sphere design creates an even lower profile for ball and socket joint 20 and permits a better fit into the relatively small housing 24. Having dissimilar centers C2, C3 for spherical portions 48, 50 provides more concentrated compression pre-loading of bearing shell 34 by preventing completely uniform load distribution, when compared to a sphere having a single radius. In addition, dissimilarity between respective radii R5, R6 contributes to more concentrated loading because there is a reduced amount of surface area over which to distribute loading. Accordingly, the present invention combines the effective pre-loading found in two piece type bearings with the low profile characteristic of a single piece bearing.

Housing 24 has an outwardly extending flange 60 that includes a plurality of bores 62 to allow attachment to a corresponding component (not shown). Housing 24 further includes a cavity 64 for receiving both bearing shell 34 and ball stud 28. Cavity 64 is defined by an upper rim 66 and a lower semi-spherical portion 68. Flange 60 is connected to both upper rim 66 and lower semi-spherical portion 68 and preferably forms a single piece component to reduce assembly costs. Initially, upper rim 66 is generally perpendicular to flange 60. Thus, cavity 64 has a shape of a cylinder located above a semi-sphere, as shown in FIG. 3. However, after ball stud 28 and bearing shell 34 are properly assembled into cavity 64, upper rim 66 is mechanically deformed into an arcuate shape that closely corresponds with outer surface 46 of bearing shell 34 as shown in FIG. 2. The mechanical deformation creates a compression pre-load on ball and joint socket 20 to reduce looseness and control the amount of force required to articulate stud 22.

Preferably, but optionally, the present invention also has an improved lubrication system 70 including a lubrication passage 72 for receiving a lubrication fitting or plug. FIG. 3 shows a circumferential lubrication groove 74 that is formed in housing cavity 64 and designed to communicate with passage 72 to efficiently distribute lubricant to ball and socket joint 20.

Figure 4C:
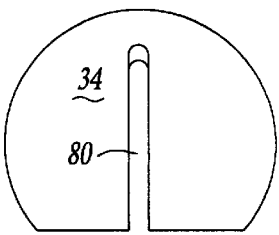
Figure 4B:
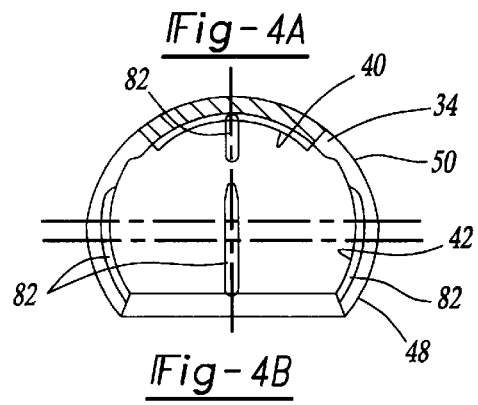

In addition, FIGS. 4A–4C further illustrate lubrication features formed in bearing shell 34. Longitudinal slots 80 pass completely through bearing shell 34 to provide a path for lubricant to enter from groove 74 in housing 24. In addition, slots 80 are spaced circumferentially apart at equal intervals. Although four slots 80 are illustrated, any suitable number of slots 80, spaced at equal or unequal intervals, can be used. Slots 80 provide a second important feature by allowing greater outward radial expansion of bearing shell 34 when ball stud 28 is being inserted into shell 34 through opening 38.

Figure 4D:
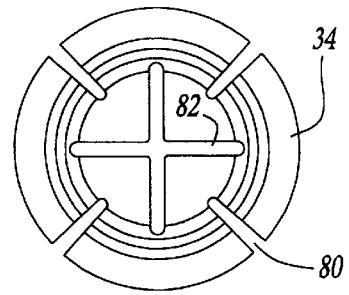

FIGS. 4B and 4D show optional grease grooves 82 formed in first and second inner bearing surfaces 40, 42. Grease grooves 82 are preferably offset relative to slots 80 to prevent unnecessarily weakening of bearing shell 34. Therefore, lubrication system 70 includes a number of grooves and slots that effectively communicate to deliver lubricant to the first and second inner bearing surfaces to minimize wear caused by ball stud 28.

Figure 5:
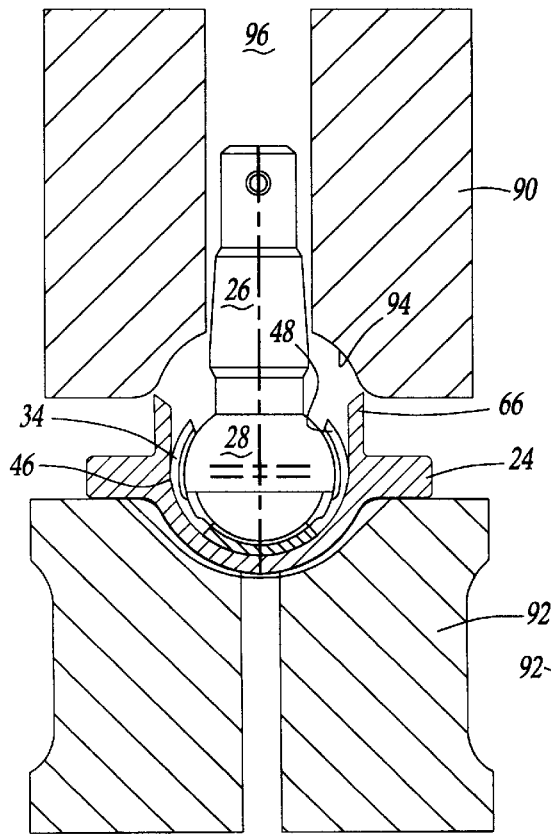
FIGS. 5 and 6 show partial cross-sectional views of the present invention during assembly.
Figure 6:
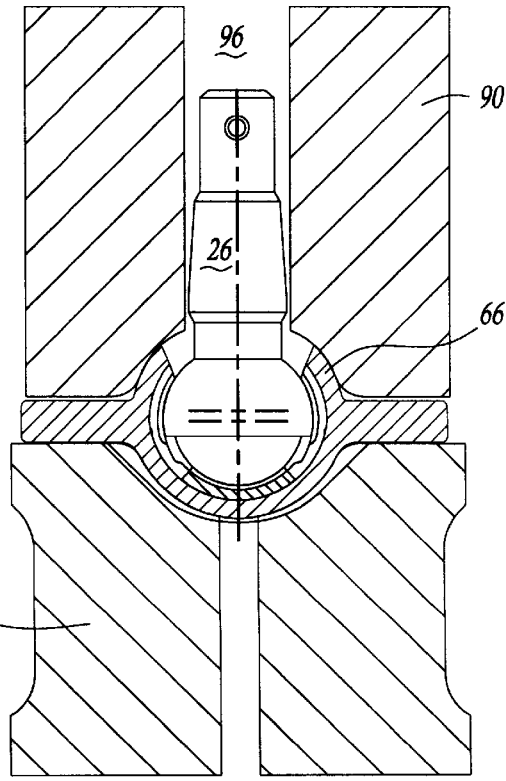

FIGS. 5 and 6 illustrate the mechanical crimping of upper rim 66 using a pair of dies 90, 92. As discussed above, upper rim 66 is mechanically deformed to securely retain ball stud 28 and bearing shell 34 in housing 24. Additionally, crimping produces a compression pre-load on ball and socket joint 20. Also, the converging sphere arrangement on outer surface 46 of bearing shell 34 is efficiently pre-loaded by the crimping of upper rim 66. Upper die 90 includes a generally arcuate surface 94 that engages upper rim 66 and progressively deforms rim 66 radially inwardly to form an arcuate shaped upper rim 66 that prevents removal of ball stud 28 and closely conforms to the shape of first spherical portion 48. A bore 96 having a larger diameter than shank 26 is also provided in uppel die 90 to allow die 90 to travel past shank 26 and engage upper rim 66.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A bearing shell for a ball and socket joint comprising:
   a generally spherically shaped hollow body;
   first and second inner bearing surfaces for mating contact with a ball stud, said first inner bearing surface having a larger radius than said second inner bearing surface;
   a generally spherical outer surface adapted to engage a housing;
   wherein said outer surface includes a first spherical portion and a second spherical portion, said first spherical portion having a first radius and a first center and said second spherical portion having, a second radius and a second center;
   wherein said first center of said first spherical portion is offset relative to said second center of said second spherical portion.

2. The bearing shell of claim 1, wherein said first center is axially offset relative to said second center.

3. The bearing shell of claim 1, wherein said first radius of said first spherical portion is different than said second radius of said second spherical portion.

4. The bearing shell of claim 3, wherein said first radius is less than said second radius.

5. The bearing shell of claim 1, further comprising at least one lubrication groove formed in said inner bearing surface.

6. The bearing shell of claim 1, wherein said first and second inner bearing surfaces are separated by a circumferential undercut.

7. The bearing shell of claim 1, further including at least one longitudinal slot for providing outward radial expansion of said bearing shell.

8. The bearing shell of claim 7, wherein said at least one longitudinal slot comprises a plurality of longitudinal slots that are circumferentially spaced apart equal distances.

9. A ball and socket joint comprising:
   a stud having a shank connected to a ball stud;
   a ball stud housing having a cavity for receiving a bearing shell and said ball stud;
   said bearing shell having a generally spherically shaped hollow body that receives said ball stud said shell further comprising first and second inner bearing surfaces for mating contact with said ball stud and a generally spherical outer surface for engaging said housing cavity, said first inner bearing surface having a larger radius than said second inner bearing surface;

wherein said outer surface of said bearing shell includes a first spherical portion and a second spherical portion, said first spherical portion having a first radius and a first center and said second spherical portion having a second radius and a second center; and wherein said first center of said first spherical portion is offset relative to said second center of said second spherical portion.

10. The ball and socket joint of claim 9, wherein said first radius of said first spherical portion is different than said second radius of said second spherical portion.

11. The ball and socket joint of claim 9, wherein said first and second inner bearing surfaces are separated by a circumferential undercut for providing improved articulation of said ball stud.

12. The ball and socket joint of claim 9, further including at least one longitudinal slot for providing outward radial expansion when said ball stud is inserted into said bearing shell.

13. The ball and socket joint of claim 9, wherein said ball stud includes a proximal ball portion adjacent said shank and a distal ball portion spaced from said shank, said distal ball portion having a smaller radius than said proximal ball portion.

14. The ball and socket joint of claim 9, wherein said housing includes a flange portion connected to a lower semi-spherical portion and an upper arcuate rim portion, said lower semi-spherical portion including said housing cavity for receiving at least a portion of said bearing shell and said upper arcuate rim imparting a compression pre-load onto said bearing shell to increase joint tightness.

15. The ball and socket joint of claim 9, wherein said housing includes a lubrication passage and said cavity includes a circumferential lubricating groove that connects to said passage.

16. A ball and socket joint comprising:

a stud having a shank connected to a ball stud, said ball stud having a proximal ball portion adjacent said shank and a distal ball portion spaced axially away from said shank, said distal ball portion having a smaller radius than said proximal ball portion;

a ball stud housing for receiving a bearing shell and said ball stud, said housing having an upper rim portion connected to a flange portion and a lower semi-spherical portion that at least partially defines a cavity;

said bearing shell having a generally spherically shaped hollow body that receives said ball stud and includes at least one inner bearing surface for mating contact with said ball stud and an outer surface for engaging said housing cavity;

wherein said outer surface of said bearing shell includes a first spherical portion and a second spherical portion, said first spherical portion having a first radius and a first center and said second spherical portion having a second radius and a second center; and wherein said first center of said first spherical portion is offset relative to said second center of said second spherical portion.

17. A ball and socket joint comprising:

a stud having a shank connected to a ball stud, said ball stud including a proximal ball portion adjacent said shank and a distal ball portion spaced from said shank, said distal ball portion having a smaller radius than said proximal ball portion;

a ball stud housing having a cavity for receiving a bearing shell and said ball stud;

said bearing shell having a generally spherically shaped hollow body that receives said ball stud and includes at least one inner bearing surface for mating contact with said ball stud and a generally spherical outer surface for engaging said housing cavity;

wherein said outer surface of said bearing shell includes a first spherical portion and a second spherical portion, said first spherical portion having a first radius and a first center and said second spherical portion having a second radius and a second center; and wherein said first center of said first spherical portion is offset relative to said second center of said second spherical portion.

* * * * *